(12) United States Patent
Komatsubara et al.

(10) Patent No.: US 9,314,000 B2
(45) Date of Patent: Apr. 19, 2016

(54) ABSORBENT ARTICLE FOR PET

(75) Inventors: Daisuke Komatsubara, Kagawa (JP); Takeshi Ikegami, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 78 days.

(21) Appl. No.: 14/123,198

(22) PCT Filed: Jun. 1, 2012

(86) PCT No.: PCT/JP2012/003639
§ 371 (c)(1),
(2), (4) Date: Nov. 29, 2013

(87) PCT Pub. No.: WO2012/164961
PCT Pub. Date: Dec. 6, 2012

(65) Prior Publication Data
US 2014/0096725 A1     Apr. 10, 2014

(30) Foreign Application Priority Data

Jun. 2, 2011 (JP) ................................ 2011-124671

(51) Int. Cl.
*A01K 23/00* (2006.01)

(52) U.S. Cl.
CPC ..................................... *A01K 23/00* (2013.01)

(58) Field of Classification Search
CPC ................................................. A01K 23/00
USPC ......................................................... 119/869
See application file for complete search history.

(56) References Cited

U.S. PATENT DOCUMENTS

| 4,568,342 | A | 2/1986 | Davis |
| 2007/0129702 | A1 | 6/2007 | Gribben |
| 2010/0094235 | A1* | 4/2010 | Solomon et al. ............... 604/359 |
| 2010/0319633 | A1* | 12/2010 | Moncheski ................... 119/869 |

(Continued)

FOREIGN PATENT DOCUMENTS

| EP | 0374730 A2 | 6/1990 |
| JP | 2004-159592 A | 6/2004 |

(Continued)

OTHER PUBLICATIONS

International Search Report for PCT/JP2012/003639 mailed Aug. 7, 2012.

(Continued)

*Primary Examiner* — Monica Williams
*Assistant Examiner* — Jessica Wong
(74) *Attorney, Agent, or Firm* — Hauptman Ham, LLP

(57) ABSTRACT

An absorbent article for pet includes: a top sheet; a back surface layer; an absorbent core, a first end portion and an opposing second end portion; side portions orthogonal to the first and the second end portion, a hook member disposed along a width direction of the absorbent article on a top sheet side in the first end portion; a first engaged portion provided on the back surface layer side in the second end portion, engageable with the hook member; folding lines extending in a longitudinal direction of the absorbent article; and a second engaged portion provided on the top sheet side in the first end portion on outer sides of the folding lines in the width direction of the absorbent article. The second engaged portion is engageable with the hook member with a smaller engagement force than that of the top sheet with the hook member.

12 Claims, 18 Drawing Sheets

(56) References Cited

U.S. PATENT DOCUMENTS

| | | |
|---|---|---|
| 2011/0209675 A1* | 9/2011 | Esperon .................... 119/868 |
| 2014/0076245 A1* | 3/2014 | Komatsubara et al. ....... 119/869 |
| 2014/0083372 A1* | 3/2014 | Komatsubara et al. ....... 119/850 |

FOREIGN PATENT DOCUMENTS

| | | |
|---|---|---|
| JP | 2007-20533 A | 2/2007 |
| JP | 3141580 U | 5/2008 |
| JP | 2009-240679 A | 10/2009 |
| JP | 2009-254278 A | 11/2009 |

OTHER PUBLICATIONS

Extended European Search Report mailed Feb. 25, 2015, corresponding to European patent application No. 12792230.0.

* cited by examiner

ABSORBENT ARTICLE FOR PET

RELATED APPLICATIONS

The present application is a National Phase of International Application Number PCT/JP2012/003639, filed Jun. 1, 2012, which claims priority to Japanese Application Number 2011-124671 filed Jun. 2, 2011.

TECHNICAL FIELD

The present invention relates to an absorbent article for pet.

BACKGROUND ART

A disposable diaper for pet to be used for a pet, such as a dog or cat, is known to the inventors. Such a disposable diaper for pet catches feces and urine of the pet by covering the anus and the urethral opening positioned between bases of hind legs when being worn.

Some pets (for example miniature dachshund having short legs and a long abdomen) have the urethral opening located further toward the front than a position between bases of hind legs. In addition, male dogs have the urethral opening located further toward the front compared to female dogs. If the disposable diaper for pet is used for pets having the urethral opening further toward the front than a position between bases of hind legs, the urethral opening may not be covered by the diaper and urine may leak.

Given this, an absorbent article for pet that is configured in a belt-like shape and to be worn in a state of being wrapped around the pet's waist is also known to the inventors.

Such an absorbent article for pet configured in a belt-like shape can cover the urethral opening, regardless of position thereof.

Such an absorbent article for pet has a hook member as an engagement member provided on an inner surface of a first end portion in the longitudinal direction of the absorbent article for pet, and an engaged member, such as a loop member or a nonwoven fabric that engages with the hook member, provided on an outer surface of a second end portion.

When in use, the first end portion of the absorbent article for pet is pulled to bring a side portion of the absorbent article for pet in the longitudinal direction into close contact with the waist of the pet, and, in this state, the hook member provided on the inner surface of the first end portion of the absorbent article for pet is engaged with the engaged member provided on the outer surface of the second end portion. The absorbent article for pet can thus be maintained in a state of being appropriately wrapped around the pet's waist.

However, the inventor(s) has recognized that in a case of providing the hook member on the inner surface of the absorbent article for pet as described above, the hook member may engage with an unexpected part, such as the top sheet constituting the inner surface of the absorbent article for pet, in a state in which the absorbent article for pet is folded in the longitudinal direction during packing and the like before use. If the hook member engages with the top sheet or the like before use as described above, engagement between the hook member and the top sheet or the like must be released before using the absorbent article for pet. By releasing the engagement between the hook member and the top sheet or the like, the inner surface of the absorbent article for pet may be damaged.

SUMMARY OF INVENTION

According to some embodiments of the present invention, an absorbent article for pet is configured to be worn in a state of being wrapped around a waist of a pet. The absorbent article for pet includes: a top sheet having a liquid permeable nonwoven fabric; a liquid impermeable back surface layer; an absorbent core disposed between the top sheet and the back surface layer; a first end portion and a second end portion opposing to each other in a longitudinal direction of the absorbent article for pet; a pair of side portions opposing to each other in a width direction of the absorbent article for pet; a hook member disposed along the width direction of the absorbent article for pet on a top sheet side in the vicinity of the first end portion; a first engaged portion that is provided on a back surface layer side in the vicinity of the second end portion and engageable with the hook member; a pair of folding lines extending in the longitudinal direction of the absorbent article for pet; and a second engaged portion provided on the top sheet side in the vicinity of the first end portion on each of outer sides of the pair of folding lines in the width direction of the absorbent article for pet, the second engaged portion being engageable with the hook member with an engagement force smaller than an engagement force of the top sheet with the hook member, in a state in which the pair of side portions are folded back from the pair of folding lines and the second engaged portion covers at least a part of the hook member.

DESCRIPTION OF EMBODIMENTS

Embodiments of the absorbent article for pet will be described hereinafter with reference to the drawings. First, the absorbent article for pet according to the first embodiment will be described hereinafter with reference to FIGS. 1 to 8.

Figure 1:
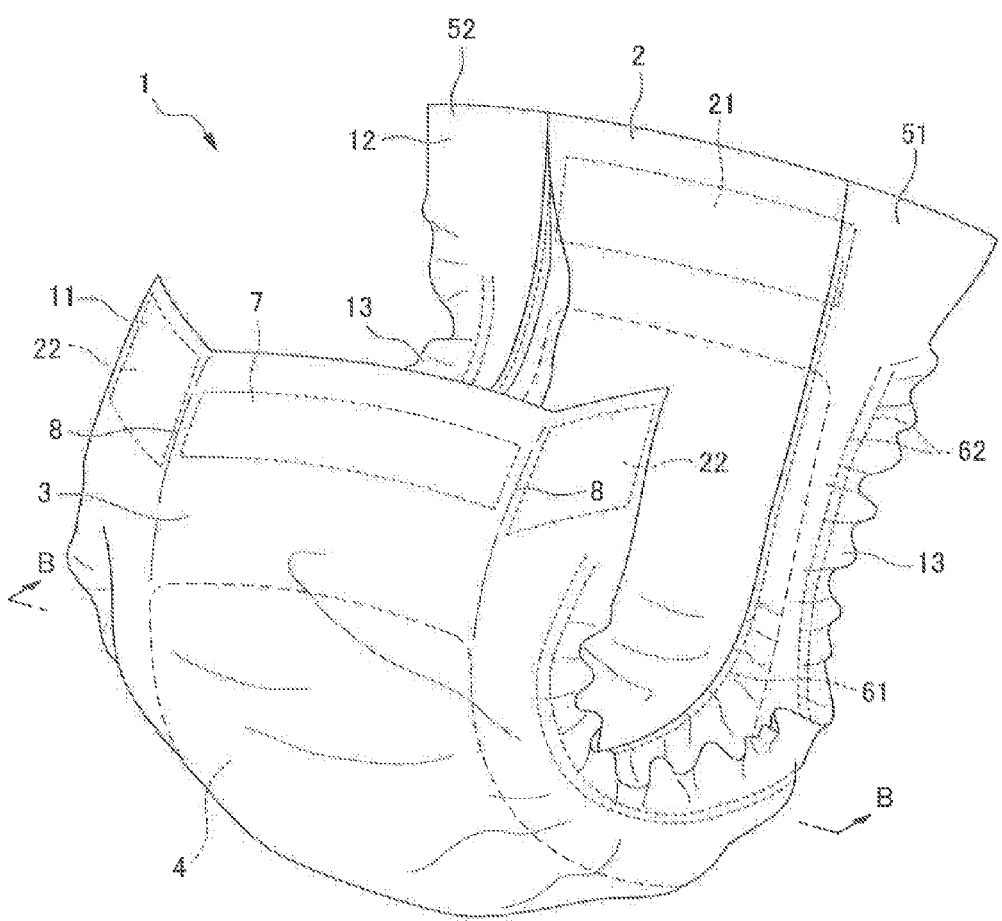
FIG. 1 is a perspective view illustrating an absorbent article for pet according to a first embodiment of the present invention.
Figure 2:
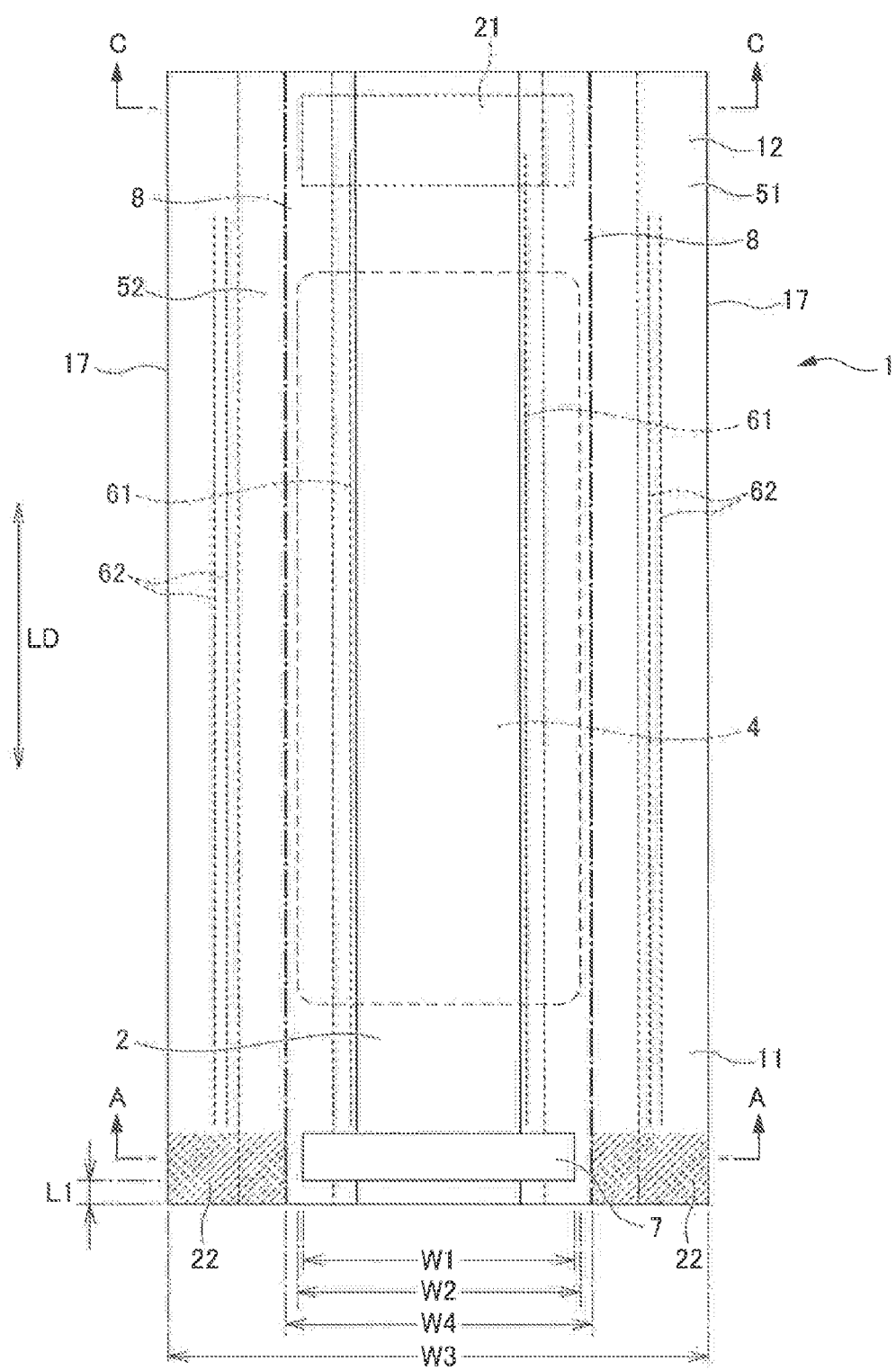
FIG. 2 is a plan view of the absorbent article for pet according to the first embodiment, as viewed from a top sheet side.
Figure 3:
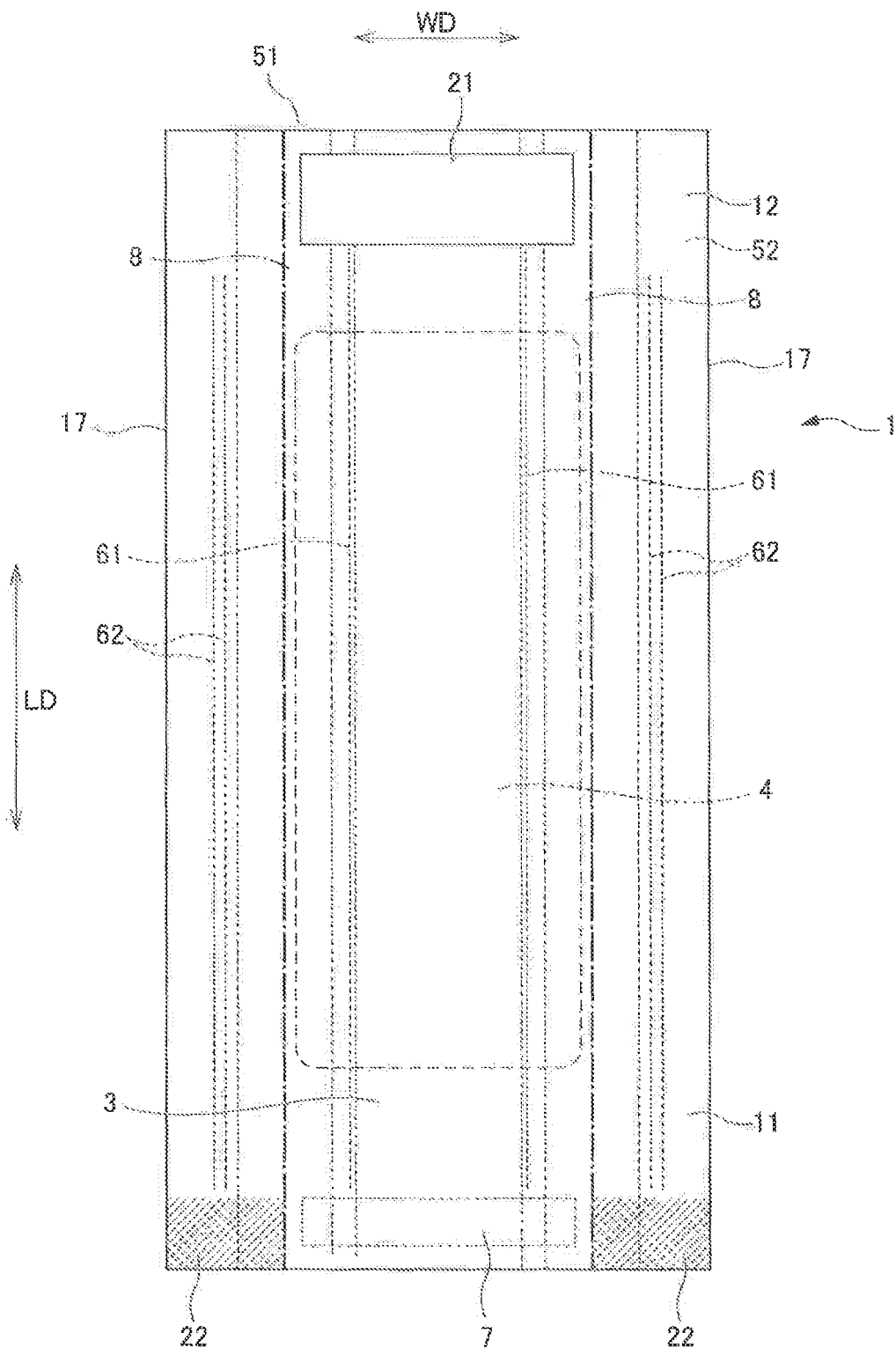
FIG. 3 is a plan view of the absorbent article for pet according to the first embodiment, as viewed from a back sheet side.

As shown in FIGS. 1 to 3, an absorbent article for pet 1 according to the first embodiment is configured in a rectangular shape with a first end portion 11 and a second end portion 12 opposing to each other and a pair of side portions 17 opposing to each other in the width direction WD of the absorbent article for pet 1 and orthogonal to the first end portion 11 and the second end portion 12. The absorbent article for pet 1 is to be worn in a state of being wrapped around the waist of a pet. The absorbent article for pet 1 is especially preferably used for a pet having the urethral opening located further toward the front than a position between bases of hind legs (for example, a dog having short legs and a long abdomen, such as miniature dachshund).

The absorbent article for pet 1 includes, as shown in FIGS. 1 to 6: a liquid permeable top sheet 2; a back surface sheet 31 and a waterproof sheet 32 constituting the liquid impermeable back surface layer 3 (back sheet 3); an absorbent core 4; a pair of side sheets 51, 52; a first elastic member 61 and a second elastic member 62; a hook tape 7 as the hook member (engagement member); a loop tape 21 as the first engaged portion; a second engaged portion 22; and a pair of folding lines 8.

The top sheet 2 is configured in a rectangular shape. The top sheet 2 mainly constitutes a surface of a side to be in contact with the pet's body. As the top sheet 2, a perforated or non-perforated nonwoven fabric and a porous plastic sheet can be used. In the present embodiment, an air-through nonwoven fabric of 10 to 40 g/m² in basis weight is used as the top sheet 2.

Figure 4:
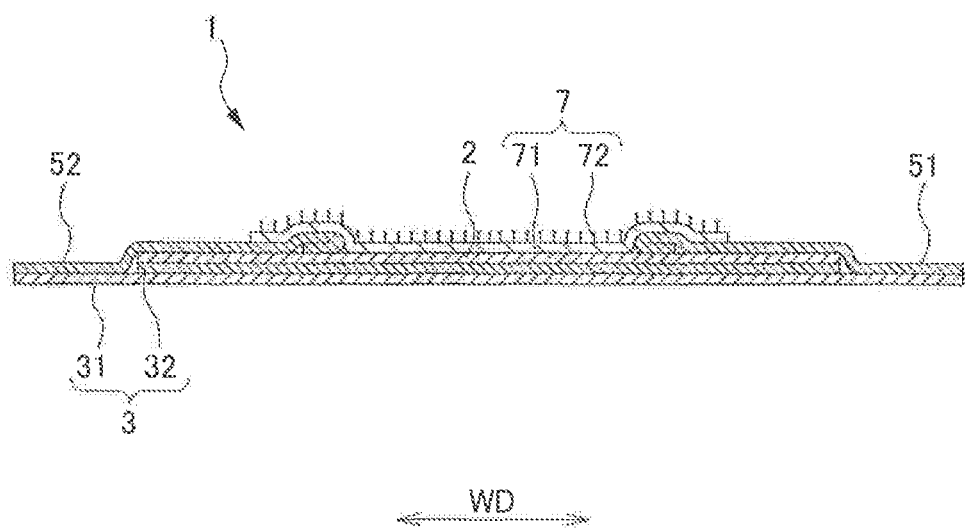
FIG. 4 is a cross-sectional view taken along the line A-A of FIG. 2.
Figure 5:
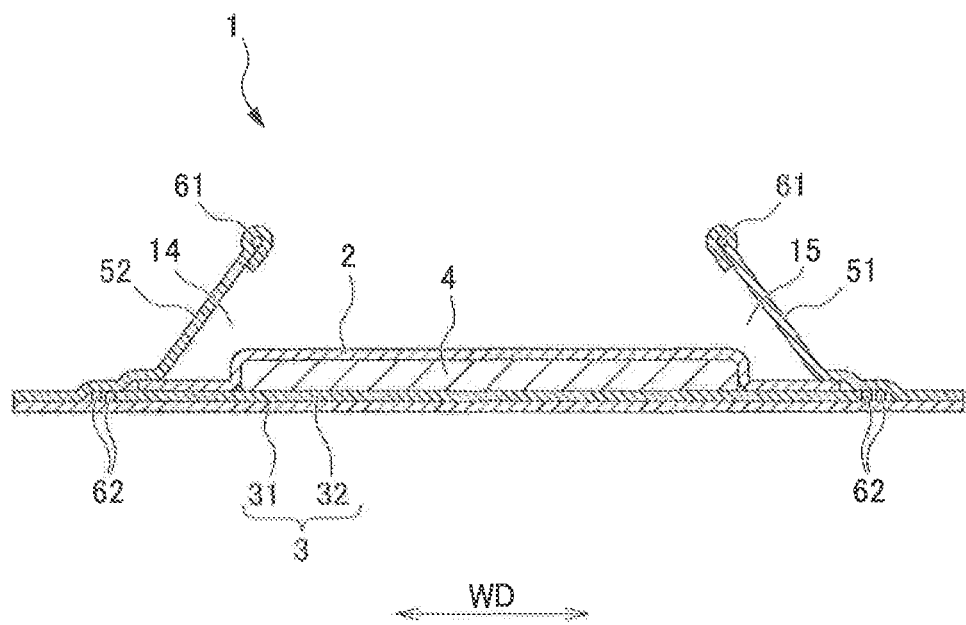
FIG. 5 is a cross-sectional view taken along the line B-B of FIG. 1.
Figure 6:
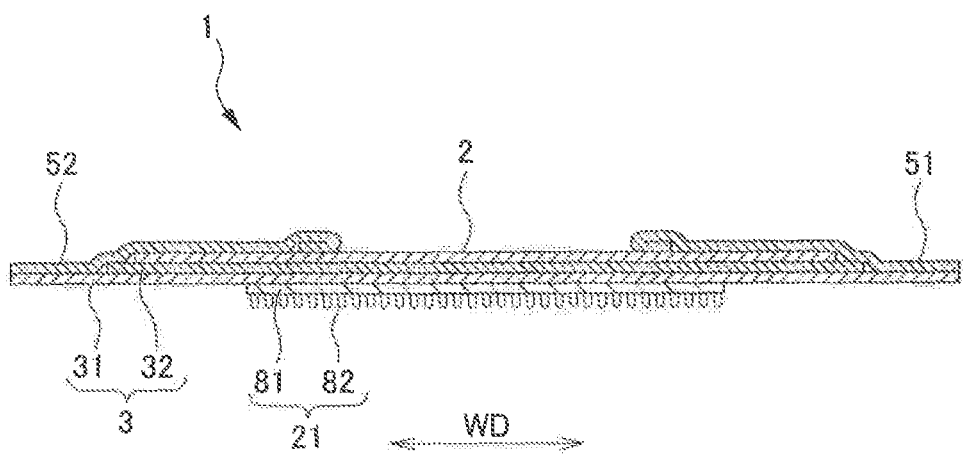
FIG. 6 is a cross-sectional view taken along the line C-C of FIG. 2.
Figure 7:
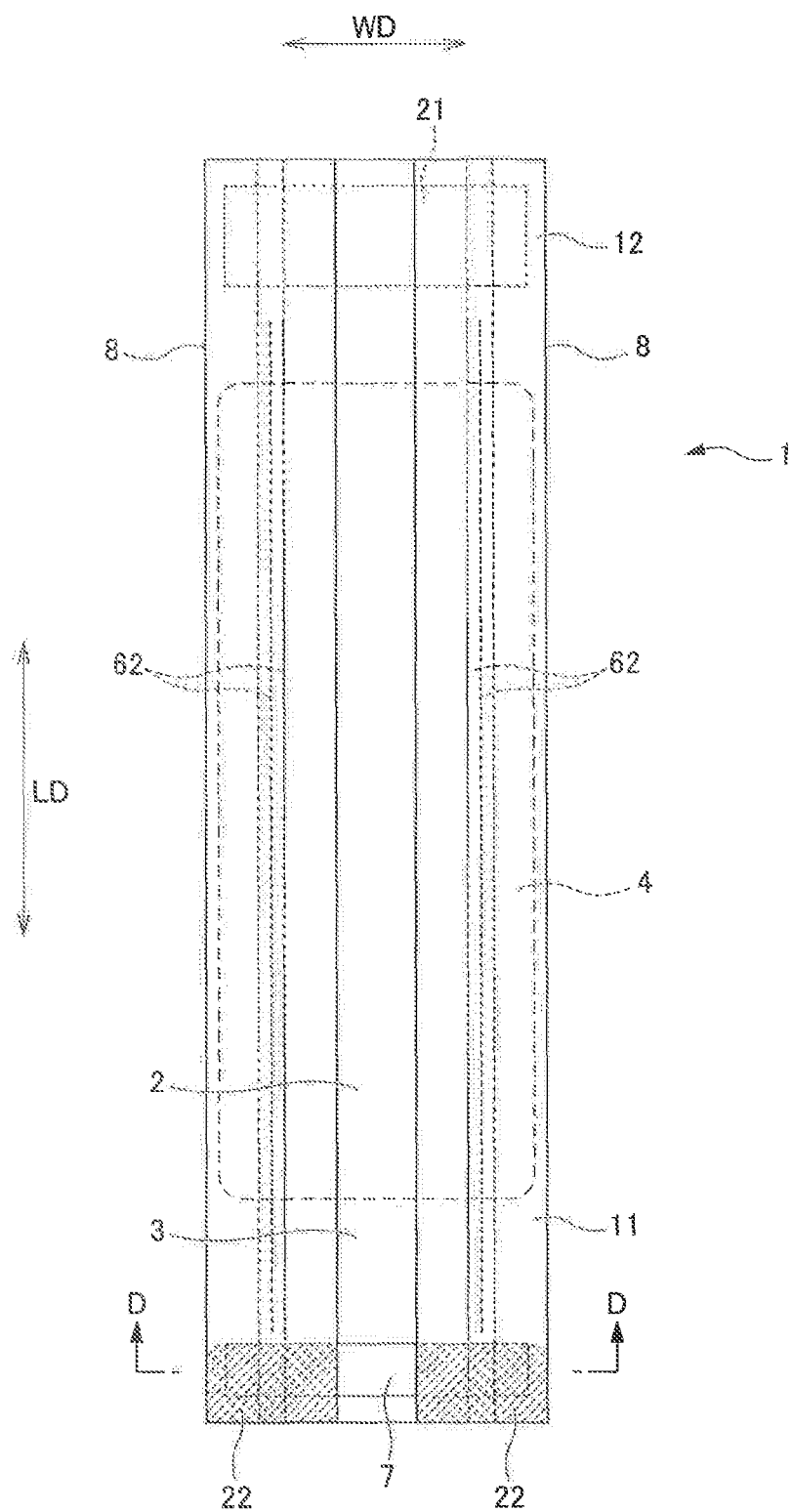
FIG. 7 is a plan view of a state in which a pair of side portions of the absorbent article for pet according to the first embodiment are folded back from a pair of folding lines, as seen from the top sheet side.

The back surface sheet 31 is configured in a rectangular shape that is wider than, and has substantially the same length as, the top sheet 2, as shown in FIGS. 4 to 6. The back surface sheet 31 constitutes a surface of the absorbent article for pet 1, on a side not to be in contact with the pet's body.

The waterproof sheet 32 is configured to be smaller in width than the back surface sheet 31 and greater in width than the top sheet 2 and disposed on a top sheet side of the back surface sheet 31.

As the back surface sheet 31 and the waterproof sheet 32, a hydrophobic nonwoven fabric, a liquid impermeable plastic film, a laminated sheet made of the nonwoven fabric and the liquid impermeable plastic film, an SMS nonwoven fabric made by sandwiching a high-water resistance melt-blown nonwoven fabric with a high-strength spun-bond nonwoven fabric, and the like can be used.

The absorbent core 4 is disposed between the top sheet 2 and the back surface layer 3 that are layered, as shown in FIG. 5. The absorbent core 4 is configured in a rectangular shape smaller in width and length than the top sheet 2 and the back surface sheet 31. The absorbent core 4 is disposed in a substantially central portion in the width direction of the top sheet 2 and the back surface sheet 31 and extends. As the absorbent core 4, fluff pulp and high absorbance polymer wrapped with a core wrapping material, such as tissue can be used.

As the fluff pulp used in the absorbent core 4, chemical pulp, cellulose fiber, and artificial cellulose fiber, such as rayon, acetate, and the like can be exemplified. As the high absorbance polymer, granulous or fibrous polymer of starch, acrylic acid, and amino acid can be exemplified.

The pair of side sheets 51, 52 are configured in an elongated rectangular shape as shown in FIG. 2 and disposed on respective side portions along the longitudinal direction of the top sheet 2 at a body side thereof. The pair of side sheets 51, 52 are configured to have substantially the same length as the top sheet 2 and the back surface sheet 31. As shown in FIGS. 4 to 6, outer edges of the pair of side sheets 51, 52 correspond to side edges of the back surface sheet 31. The outer edges of the pair of side sheets 51, 52 are joined with the side edges of the back surface sheet 31.

A part of the inner edges of the pair of side sheets 51, 52 is a free-end, as shown in FIGS. 1 and 5. More specifically, the inner edges of the pair of side sheets 51, 52 are joined with the top sheet 2 in the vicinity of the first end portion 11 positioned on a first end side in the longitudinal direction of the absorbent article for pet 1 and in the vicinity of the second end portion 12 positioned on a second end side, as shown in FIGS. 4 and 6. Parts of the inner edges of the pair of side sheets 51, 52 are free ends, except for the first end portion and the second end portion in the longitudinal direction LD of the pair of side sheets 51, 52 as shown in FIGS. 1 and 5.

As the side sheets 51, 52, a water repellent or hydrophobic sheet is preferably used. More specifically, various nonwoven fabrics, such as spun lace nonwoven fabric, spun bond nonwoven fabric, thermal bond nonwoven fabric, melt-blown nonwoven fabric, SMS nonwoven fabric, needle-punched nonwoven fabric, air-through nonwoven fabric and the like can be used. As the fiber constituting the nonwoven fabric, synthetic fiber of olefin, polyester, polyamide and the like, such as polyethylene and polypropylene; regenerated fiber, such as rayon and cupra; and natural fiber, such as cotton can be used. As the side sheets 51, 52, an SMS nonwoven fabric of 10 to 25 g/m² in basis weight is used.

In the first embodiment, the side sheets 51, 52 are configured with a nonwoven fabric having a small engagement force with the hook tape 7. More specifically, the engagement force of the side sheets 51, 52 with the hook tape 7 is configured to be smaller than the engagement force of the top sheet 2 with the hook tape 7. An engagement force of the side sheets 51, 52 with respect to the hook tape 7 is preferably 0.1 N to 1.5 N; more preferably 0.1 N to 0.8 N; and further more preferably 0.3 N to 0.6 N. An engagement force of the top sheet 2 is within the range of 0.6 N to 3 N and preferably 0.6 N to 2 N.

The engagement force is obtained by the following method.

First, the hook tape is cut into a test piece of 25 mm by 60 mm. An end portion of the test piece is held by a chuck by 10 mm. The nonwoven fabric such as the first side sheet 51, the second side sheet 52 or the top sheet 2, which is an engagement target of the hook tape, is stuck to a stainless panel with a double-stick tape. The test piece is placed on the engagement target and engaged therewith by a pressurizing roller of 700 g moving back and forth thereon at 300 mm/min. The stainless panel is set to a measuring instrument "Autograph" manufactured by Shimadzu Corporation. An end portion of the test piece is peeled from the stainless panel such that the test piece makes 135 degrees with respect to the stainless panel. Here, a value upon disengagement is measured as the engagement force (N) and engagement strength is obtained by dividing N by a width of the test piece (25 mm in the present measurement) (N/25 mm). Peeling of the test piece is performed under conditions of: a distance in a perpendicular direction between the chuck and the test piece (hook tape) of 10 mm; a pulling rate of 300 mm/min; an ambient temperature of 20 degrees centigrade; and relative humidity of 65%.

The engagement force in the present embodiment is a value obtained by multiplying the engagement strength of the test piece thus obtained by a width of the side sheets 51, 52 or top sheet 2 according to the embodiment.

The first elastic member 61 is disposed in the vicinity of the inner edge of each of the pair of side sheets 51, 52, as shown in FIGS. 1 to 3. More specifically, the first elastic member 61 is sandwiched by the side sheet that is folded back from the inner edge side and fixed to the side sheet by a hotmelt adhesive in an extended state as shown in FIG. 5. The first elastic member 61 is, in the extended state, greater in length than the absorbent core 4 in the longitudinal direction and is disposed on the pair of side sheets 51, 52 as shown in FIGS. 2 and 3.

The second elastic member 62 is disposed in each of the pair of side portions 17 along the longitudinal direction LD of the absorbent article for pet 1, as shown in FIGS. 1 to 3. More specifically, the second elastic member 62 is disposed between the pair of side sheets 51, 52 and the back surface sheet 31, as shown in FIG. 5. In addition, the second elastic member 62 is fixed to the side sheets 51, 52 and the back surface sheet 31 by a hotmelt adhesive.

The second elastic member 62 is, in the extended state, greater in length than the absorbent core 4 in the longitudinal direction and is disposed in each of the pair of side portions along the longitudinal direction LD of the absorbent article for pet 1.

As the first elastic member 61 and the second elastic member 62, any material that is elongated and stretchable can be used, for example: natural rubber, such as filiform rubber and flat rubber; thermoplastic elastomer, such as urethane, ethylene-vinyl acetate copolymer (EVA), and PE. More specifically, as the thermoplastic elastomer, polybutadiene, polyisoprene, styrene-butadiene copolymer, styrene-isoprene copolymer, polyurethane, ethylene-vinyl acetate copolymer, ethylene-alpha-olefin copolymer and the like that are processed to be filiform or formed in a film and then slitted into thin strips can be exemplified.

The hook tape 7 is disposed on an inner surface of the first end portion 11 (i.e., on the top sheet side), as shown in FIGS. 1 to 3. The hook tape 7 is configured in a rectangular shape and disposed such that a longitudinal direction thereof is along the width direction WD of the absorbent article for pet 1.

As shown in FIG. 4, the hook tape 7 has a rectangular shaped base portion 71 and a plurality of hook portions 72 provided on one face of the base portion 71.

In the hook tape 7, the base portion 71 and the plurality of hook portions 72 are integrally formed with a synthetic resin material, such as polypropylene.

A dimension W1 of the hook tape 7 in the width direction WD of the absorbent article for pet 1 (i.e., in the longitudinal direction of the hook tape 7) is configured to be substantially the same as a dimension W2 of the absorbent core 4 in the width direction WD as shown in FIG. 2. The dimension W1 of the hook tape 7 is preferably 30 to 80% and more preferably 45 to 70% of a dimension W3 of the absorbent article for pet 1 in the width direction WD, for obtaining an intended engagement force between the first end portion 11 and the second end portion 12 upon putting on the absorbent article for pet 1 to a pet.

The loop tape 21 is disposed on an outer surface (i.e., on the back sheet side) of the second end portion 12, as shown in FIGS. 1 to 3. The loop tape 21 is configured in a belt-like shape to engage with the hook tape 7 and disposed such that a longitudinal direction thereof is along the width direction WD of the absorbent article for pet 1. A dimension of the loop tape 21 in the longitudinal direction thereof (i.e., in the width direction WD) is configured to be substantially the same as the dimension W1 of the hook tape 7. A dimension of the loop tape 21 in the width direction thereof (i.e., in the longitudinal direction LD) is configured to be greater than the dimension of the hook tape 7 in the width direction thereof (i.e., in the longitudinal direction LD).

As shown in FIG. 6, the loop tape 21 has a rectangular shaped base portion 81 and a plurality of loop portions 82 provided on one face of the base portion 81. The loop tape 21 is attached to the back surface layer 3 such that a face on which the plurality of loop portions 82 is formed is directed to the outer surface of the absorbent article for pet 1.

In the loop tape 21, the base portion 81 and the plurality of loop portions 82 are integrally formed with a synthetic resin material, such as polyethylene. The engagement force of the loop tape 21 with respect to the hook tape is obtained in the same way as the engagement force of the side sheet, and is within the range of 0.6 N to 3 N and preferably 0.6 N to 2 N.

The pair of folding lines 8 extend in the longitudinal direction LD of the absorbent article for pet 1, as shown in FIGS. 1 to 3 and 7. The pair of folding lines 8 are formed by creasing the top sheet 2, the pair of side sheets 51, 52, the back surface sheet 31 and the waterproof sheet 32 in the longitudinal direction LD of the absorbent article for pet 1. The folding lines 8 are used as starting points for folding the pair of side portions 17 toward the top sheet side.

A dimension W4 between the pair of folding lines 8 in the width direction WD is configured to be equal or greater than the dimension W2 of the absorbent core 4 in the width direction WD.

The pair of folding lines 8 are formed outward of the hook tape 7 in the width direction WD of the absorbent article for pet 1. In addition, the pair of folding lines 8 are formed outward of the inner edges of the pair of side sheets 51, 52 in the width direction WD of the absorbent article for pet 1. The pair of folding lines 8 are formed such that, in a state in which the pair of side portions 17 are folded back from the pair of folding lines 8, the outer edges of the pair of side sheets 51, 52 are positioned inward of the inner edges of the pair of side sheets 51, 52 in the width direction of the absorbent article for pet 1 (See FIGS. 7 and 8).

The second engaged portion 22 is provided on the top sheet side, at least in the vicinity of the first end portion 11, and outward of the folding lines 8 in the width direction WD of the absorbent article for pet 1, as shown in FIGS. 2 and 3.

The engagement force of the second engaged portion 22 with the hook tape 7 is configured to be smaller than the engagement force of the loop tape 21 with the hook tape 7. In addition, the engagement force of the second engaged portion 22 with the hook tape 7 is configured to be smaller than the engagement force of the top sheet 2 with the hook tape 7.

In the first embodiment, the second engaged portion 22 is configured with a part of the pair of side sheets 51, 52 in the vicinity of the first end portion 11.

Before use, the absorbent article for pet 1 according to the first embodiment is folded in two in the longitudinal direction LD with the top sheet side being directed inward, in a state in which the pair of side portions 17 are folded back toward the top sheet side from the pair of folding lines 8.

Figure 8:
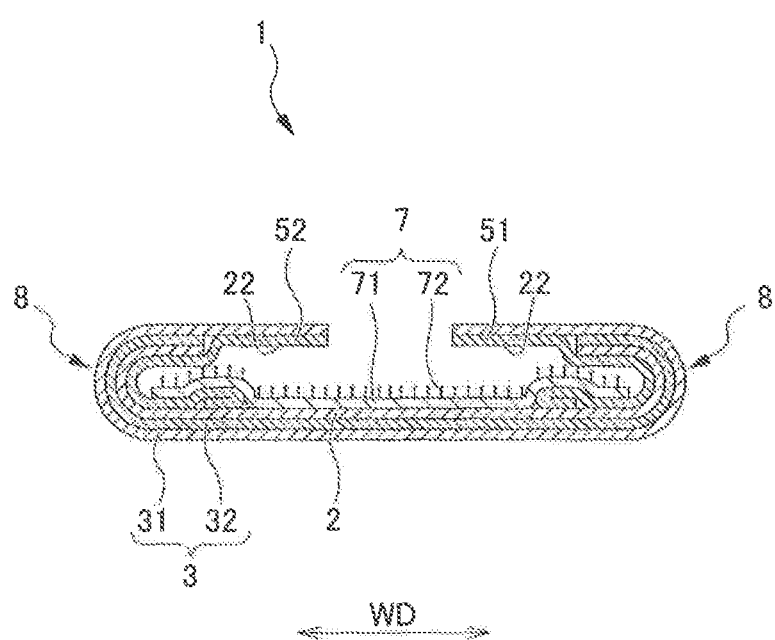
FIG. 8 is a cross-sectional view taken along the line D-D of FIG. 7.

In this state, as shown in FIG. 8, parts of the hook tape 7 including at least both end portions thereof in the width direction WD are covered by the second engaged portion 22 which preferably covers 50 to 100% of an entire area of the hook tape 7.

In the above-described absorbent article for pet 1, the first elastic member 61 in the extended state is fixed to the pair of side sheets 51, 52 along the longitudinal direction LD of the absorbent article for pet 1. In addition, the second elastic member 62 in the extended state is fixed between the side sheets 51, 52 and the back surface sheet 31, along the longitudinal direction LD of the absorbent article for pet 1.

Given this, the absorbent article for pet 1 in a natural state (without external force applied) has a three-dimensional shape as shown in FIG. 1, with the first elastic member 61 and the second elastic member 62 being contracted to thereby bring the first end portion 11 and the second end portion 12 close to each other, with the top sheet side constituting an inner surface. A pair of waist gather portions 13 that are stretchable in the longitudinal direction LD are thus formed on a pair of side portions in the longitudinal direction LD of the absorbent article for pet 1 (see FIG. 1). In addition, the free ends of the pair of side sheets 51, 52 lift, to thereby form pocket portions 14, 15 between the inner surfaces of the pair of side sheets 51, 52 and the top sheet 2.

Figure 9:
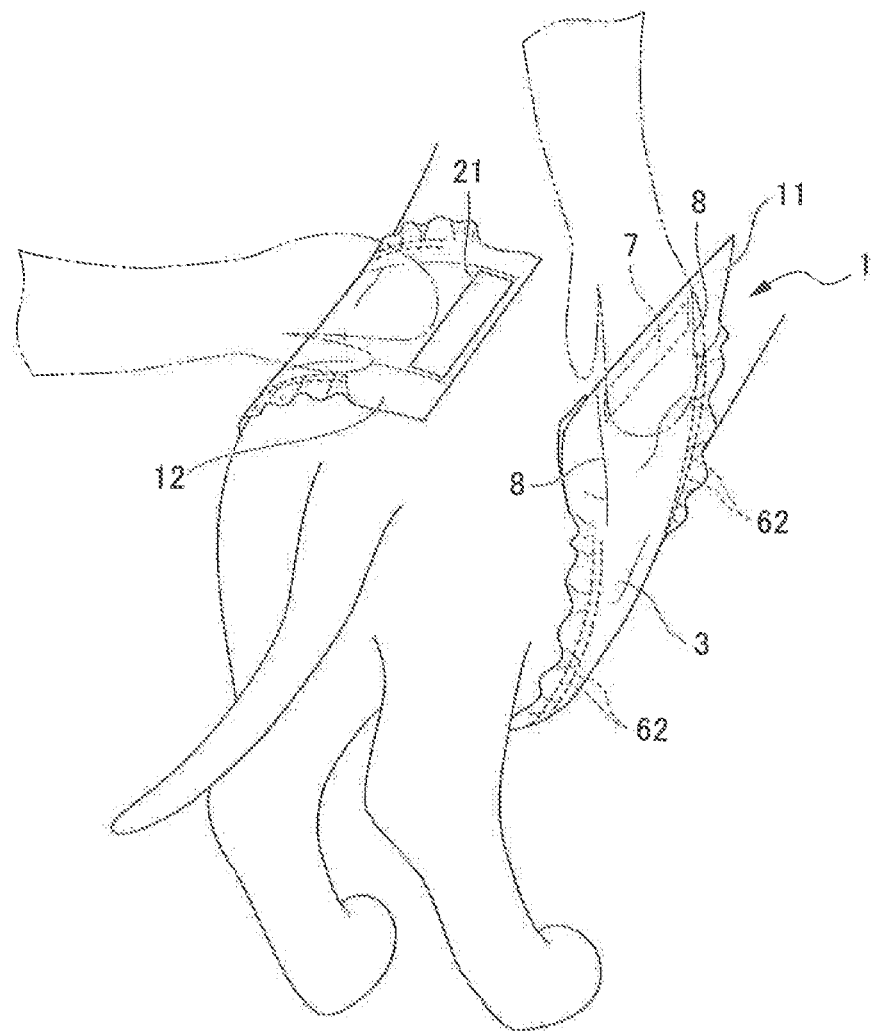
FIG. 9 is a diagram illustrating a process of putting the absorbent article for pet on a pet, in which the second end portion is placed on the pet's back.
Figure 10:
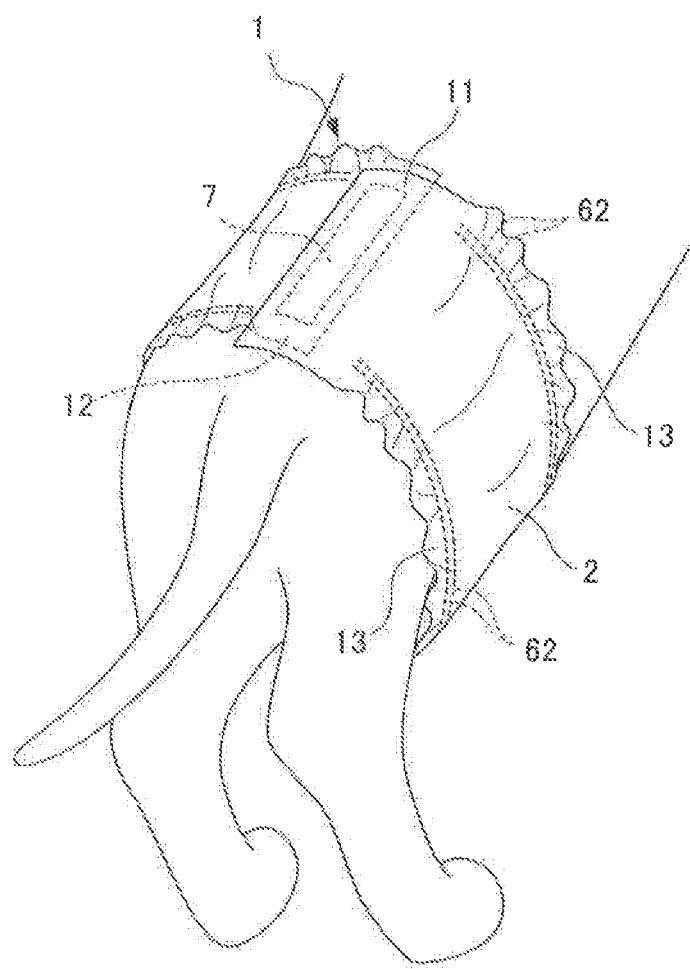
FIG. 10 is a diagram illustrating a state in which the absorbent article for pet according to the first embodiment is put around the pet's waist.

Next, steps of putting on the absorbent article for pet according to the first embodiment to a pet will be described hereinafter with reference to FIGS. 9 and 10. FIGS. 9 and 10 are diagrams illustrating a process of putting the absorbent article for pet according to the first embodiment on a pet. FIG. 9 is a diagram illustrating a state in which the second end portion 12 is placed on the pet's back; and FIG. 10 is a diagram illustrating a state in which the absorbent article for pet 1 is put on to the pet's waist.

First, as shown in FIG. 9, the second end portion 12 of the absorbent article for pet 1 is placed on the back of the pet and the vicinity of the second end portion 12 is held by one hand of a user. Next, in a state in which the vicinity of the second end portion 12 is held by one hand, the first end portion 11 of the absorbent article for pet 1 is held by the other hand and wrapped around the pet's body to cover an abdomen of the pet.

And then, the first end portion 11 of the absorbent article for pet 1 is pulled to bring the pair of waist gather portions 13 into close contact with the pet's waist.

Thereafter, as shown in FIG. 10, the hook tape 7 provided on the inner surface (the top sheet side) of the first end portion 11 of the absorbent article for pet 1 is engaged with the loop tape 21 provided on the outer surface (the back surface sheet 31 side) of the second end portion 12. The absorbent article for pet 1 is thus wrapped around the pet's waist.

Figure 11:
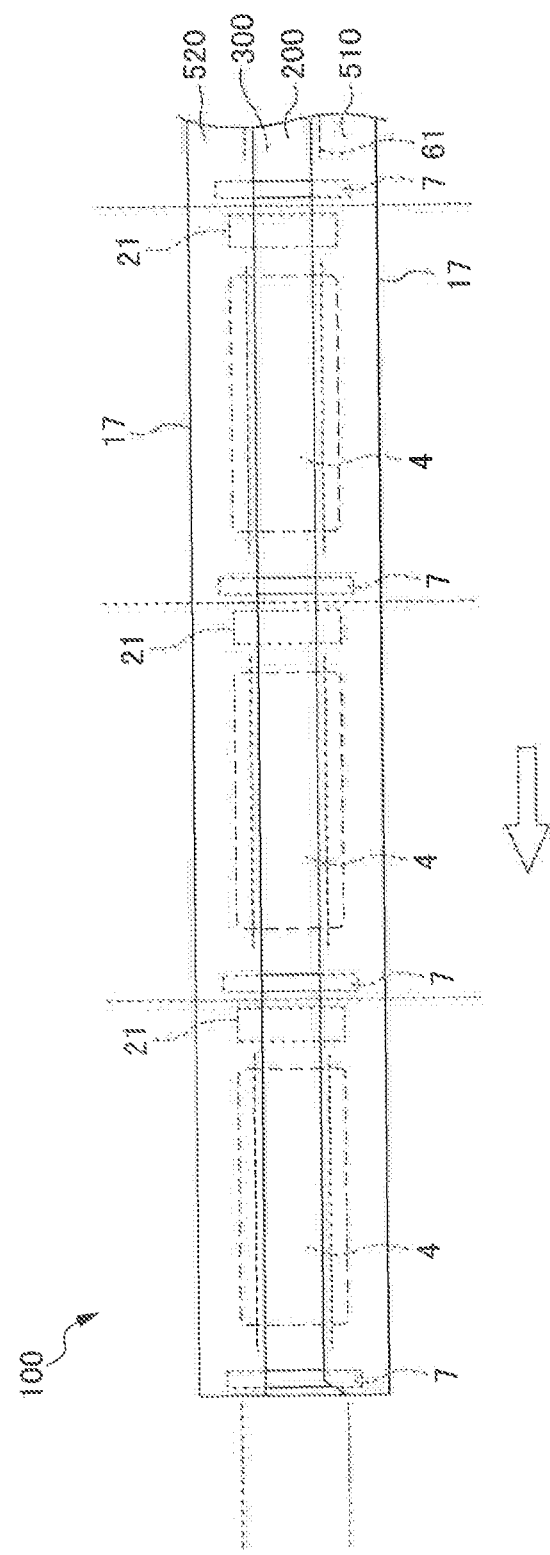
FIG. 11 is a plan view illustrating a continuous body formed in a manufacturing method of the absorbent article for pet according to the first embodiment.
Figure 12:
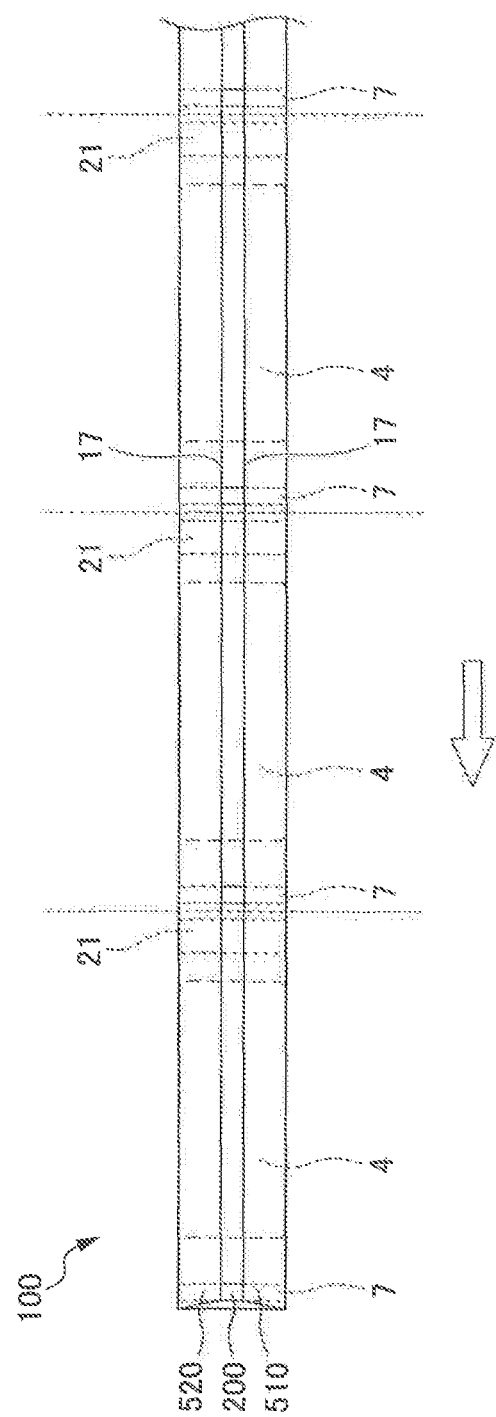
FIG. 12 is a plan view illustrating a fold-back structure in the manufacturing method of the absorbent article for pet according to the first embodiment.

Next, the manufacturing method of the absorbent article for pet 1 according to the first embodiment is described hereinafter with reference to FIGS. 11 and 12. FIGS. 11 and 12 are plan views of steps of the manufacturing method of the absorbent article for pet 1.

First, a continuous body 100 of the absorbent article for pet 1 is formed. More specifically, a plurality of absorbent cores 4 is arranged between a continuous top sheet 200 and a continuous back surface layer 300 (not shown) at predetermined intervals in a longitudinal direction.

On the continuous top sheet 200, hook tapes 7 are attached at positions where the absorbent cores 4 are not arranged.

Next, a continuous first side sheet 510 and a continuous second side sheet 520 are arranged on a pair of side portions of the continuous top sheet 200. On inner portions of the continuous first side sheet 510 and the continuous second side sheet 520, the first elastic members 61 are arranged in advance in an extended state. The inner portions of the continuous first side sheet 510 and the continuous second side sheet 520 are folded back inwards and fixed by bonding with an adhesive (see FIG. 5).

As shown in FIG. 11, an outer portion of the continuous first side sheet 510 and an outer portion of the continuous second side sheet 520 are respectively joined with an outer portion of the continuous back surface layer 300 and an outer portion of the continuous top sheet 200. Here, on an outer side in the width direction of the continuous top sheet 200, the second elastic member 62 is disposed between the outer portion of the continuous first side sheet 510 and the continuous back surface layer 300, as well as between the outer portion of the continuous second side sheet 520 and the continuous back surface layer 300, and bonded (see FIG. 5).

In addition, on a back side of the continuous back surface layer 300, the loop tape 21 is disposed at a position facing the hook tape 7 across the absorbent core 4.

Next, as shown in FIG. 12, a pair of side portions of the continuous body of the absorbent article for pet 100 is folded back toward the continuous top sheet 200 such that continuous first side sheet 510 and the continuous second side sheet 520 are folded back on itself in the width direction. More specifically, a pair of sides 17 of the continuous body of the absorbent article for pet 100 is folded back toward the continuous top sheet 200.

Here, parts of the continuous first side sheet 510 and of the continuous second side sheet 520 overlapping the hook tape compose a second engaged portion. The continuous first side sheet 510 and continuous second side sheet 520 in a state of being folded back cover a part of the hook tape 7. Since the continuous first side sheet 510 and the continuous second side sheet 520 have only a low engagement force with respect to the hook tape 7, the side sheets 51 and 52 can be easily detached from the hook tape upon using.

As shown in FIG. 12, the continuous body of the absorbent article for pet 100 is cut in the width direction at predetermined intervals in the longitudinal direction.

The absorbent article for pet thus cut and shaped is double-folded such that the top sheet 2 faces itself. And then, a plurality of absorbent articles for pet 1 thus double-folded is put in a package bag in a state of being stacked (not illustrated).

The above-described absorbent article for pet 1 according to the first embodiment provides the following effects.

(1) The rectangular hook tape 7 extending in the width direction WD of the absorbent article for pet 1 is provided on the top sheet side of the first end portion 11, and the pair of folding lines 8 extending in the longitudinal direction LD of the absorbent article for pet 1 are formed. In addition, in the vicinity of the first end portion 11 and on the top sheet side, the second engaged portion 22 is disposed outward of the folding lines 8 in the width direction WD of the absorbent article for pet 1, and the engagement force of the second engaged portion 22 with the hook tape 7 is configured to be smaller than the engagement force of the top sheet 2 with the hook tape 7. As a result, in an unused state of the absorbent article for pet 1 in which the pair of side portions 17 are folded back from the pair of folding lines 8, the parts of the hook tape 7 including at least both end portions thereof in the width direction WD can be covered by the second engaged portion 22 that is easier to peel off from the hook tape 7 than the top sheet 2. Therefore, even if the hook tape 7 that is elongated in the width direction WD of the absorbent article for pet 1 is provided for increased engagement force between the first end portion 11 and the second end portion 12 upon putting on the absorbent article for pet 1, the hook tape 7 can be prevented from engaging with an unexpected part (the top sheet 2 and the back surface sheet 31) of the absorbent article for pet 1. In addition, by configuring the engagement force of the second engaged portion 22 with the hook tape 7 to be low, the second engaged portion 22 is not easily damaged upon releasing engagement between the hook tape 7 and the second engaged portion 22.

(2) The pair of side sheets 51, 52 are provided along the side portion 17 extending in the longitudinal direction LD of the absorbent article for pet 1, and the inner edges of the pair of side sheets 51, 52 are configured to be positioned inward of the pair of folding lines 8. The second engaged portion 22 can thus be formed by the pair of side sheets 51, 52. As a result, since the second engaged portion 22 can be configured of the pair of side sheets 51, 52 constituting the pocket portions 14, 15, the absorbent article for pet 1 in which the hook tape 7 can be prevented from engaging with an unexpected part (the top sheet 2 and the back surface sheet 31) can be manufactured without increasing the number of components.

(3) In a state in which the pair of side portions 17 are folded back from the pair of folding lines 8, the outer edge of the pair of side sheets 51, 52 is positioned more inward in a width direction WD of the absorbent article for pet 1 than the inner edge of the pair of side sheets 51, 52. An area of a part of the hook tape 7 covered by the second engaged portion 22 can thus be made greater.

(4) The dimension W1 of the hook tape 7 in the longitudinal direction thereof is configured to be 30 to 80% (more preferably 45 to 70%) of the dimension W3 of the absorbent article for pet 1 in the width direction WD, and in a state in which the pair of side portions 17 are folded back from the pair of folding lines 8, the second engaged portion 22 covers 50 to 100% of an entire area of the hook tape 7. At least 50% of the entire area of the hook tape 7 can thus be covered by the second engaged portion 22, to thereby further suppressing engagement of the hook tape 7 with an unexpected part. By suppressing engagement of the hook tape 7 with an unexpected part, the hook tape 7 can be configured to be long and the engagement force between the first end portion 11 and the second end portion 12 upon wearing can be increased.

(5) The pair of folding lines 8 are formed outward of the hook tape 7 in the width direction WD of the absorbent article for pet 1. As a result, since the folding lines 8 can be formed at a position where the hook tape 7 of a greater stiffness is not provided, the pair of side portions 17 can be easily folded back.

Figure 13:
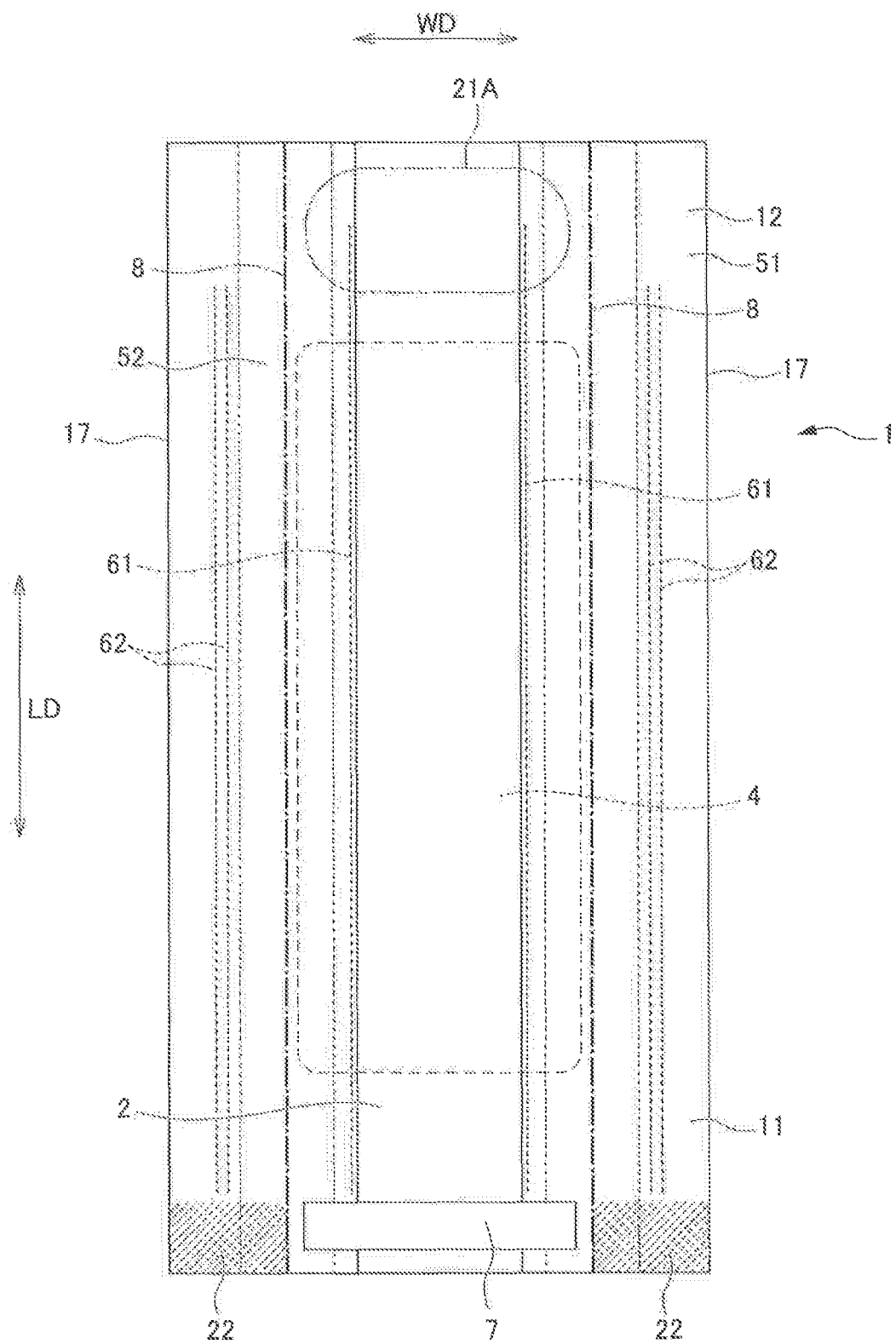
FIG. 13 is a plan view of the absorbent article for pet according to a second embodiment, as viewed from the top sheet side.
Figure 14:
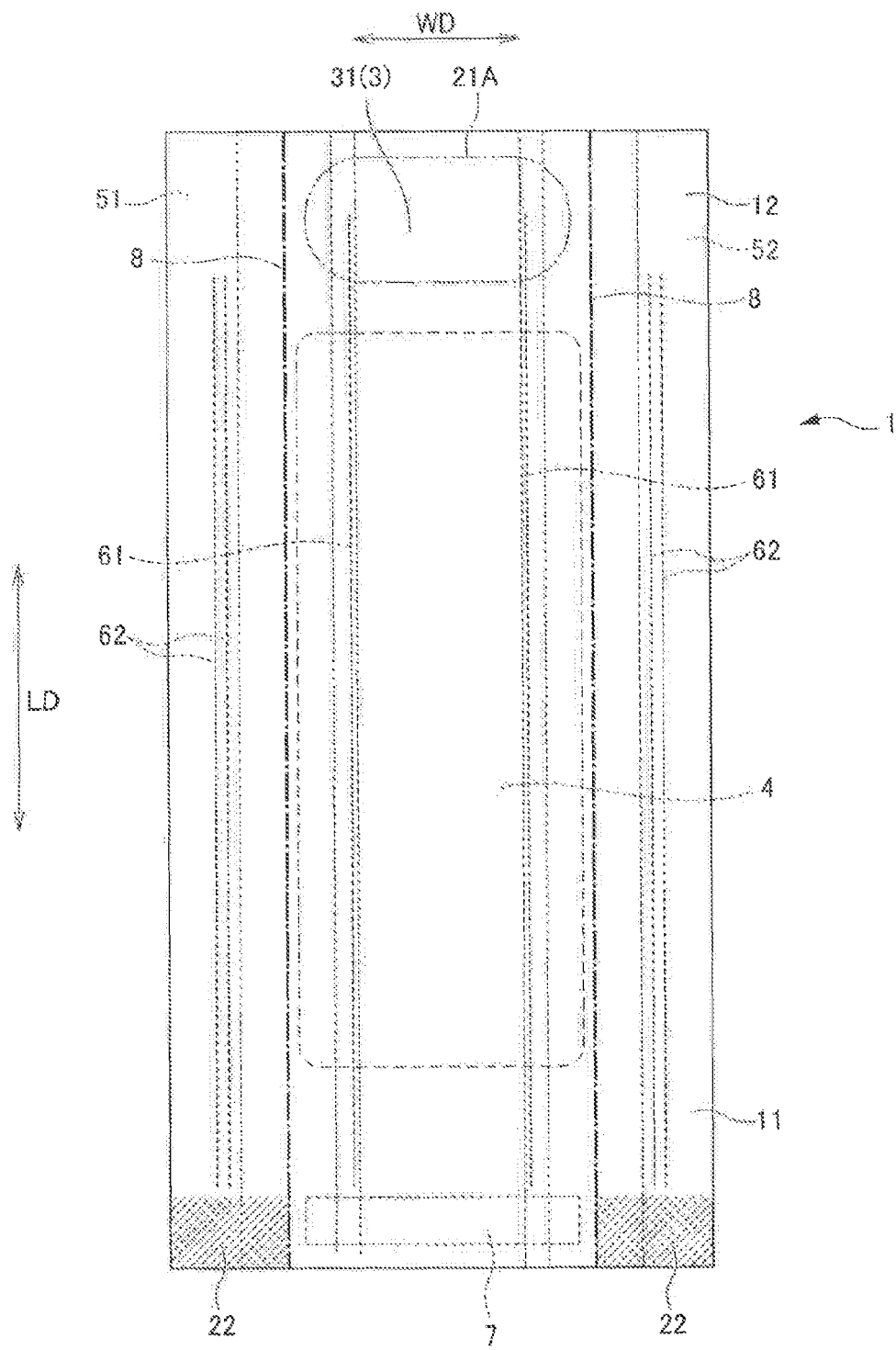
FIG. 14 is a plan view of the absorbent article for pet according to the second embodiment, as viewed from the back sheet side.

Next, the absorbent article for pet according to the second embodiment will be described hereinafter with reference to FIGS. 13 and 14. FIG. 13 is a plan view of the absorbent article for pet 1 according to the second embodiment, as viewed from the top sheet side; and FIG. 14 is a plan view of the absorbent article for pet 1 according to the second embodiment, as viewed from the back surface sheet 31 side.

In the description of the following embodiments, the same constituent features as those described with respect to the first embodiment are referred by the same reference numerals and description thereof is omitted or simplified.

The absorbent article for pet 1 according to the second embodiment is different from the first embodiment mainly in that the first engaged portion 21A is configured of the back surface sheet 31.

In the second embodiment, the back surface sheet 31 includes a nonwoven fabric with which the hook tape 7 (the hook portions 72) can engage. As the back surface sheet 31, a spun-bonded nonwoven fabric of 10 to 30 g/m² in basis weight is used. In the present embodiment, the engagement force of the back surface sheet with respect to the hook tape is obtained in the same way as the engagement force of the side sheet, and is within the range of 0.6 N to 3 N and preferably 0.6 N to 2 N. Thus, as the back surface sheet 31, a nonwoven fabric having an engagement force greater than the engagement force of the side sheets 51, 52 with the hook tape 7 is used. In other words, the engagement force of the side sheets 51, 52 with the hook tape 7 is configured to be smaller than the engagement force of the back sheet 3 with the hook tape 7.

The absorbent article for pet 1 according to the second embodiment provides the following effects, in addition to the above effects (1) to (5).

(6) The first engaged portion 21A is configured by the back surface sheet 31, and the engagement force of the side sheets 51, 52 with the hook tape 7 is configured to be smaller than the engagement force of the back surface sheet 31 with the hook tape 7. Since the hook tape 7 can be engaged with the first end portion 11 without using the loop tape 21, the number of components required for manufacture of the absorbent article for pet 1 can be reduced. In addition, since the engagement force of the side sheets 51, 52 as the second engaged portion 22 with the hook tape 7 is configured to be small, the side sheets 51, 52 are not easily damaged upon releasing the engagement between the hook tape 7 and the side sheets 51, 52.

Figure 15:
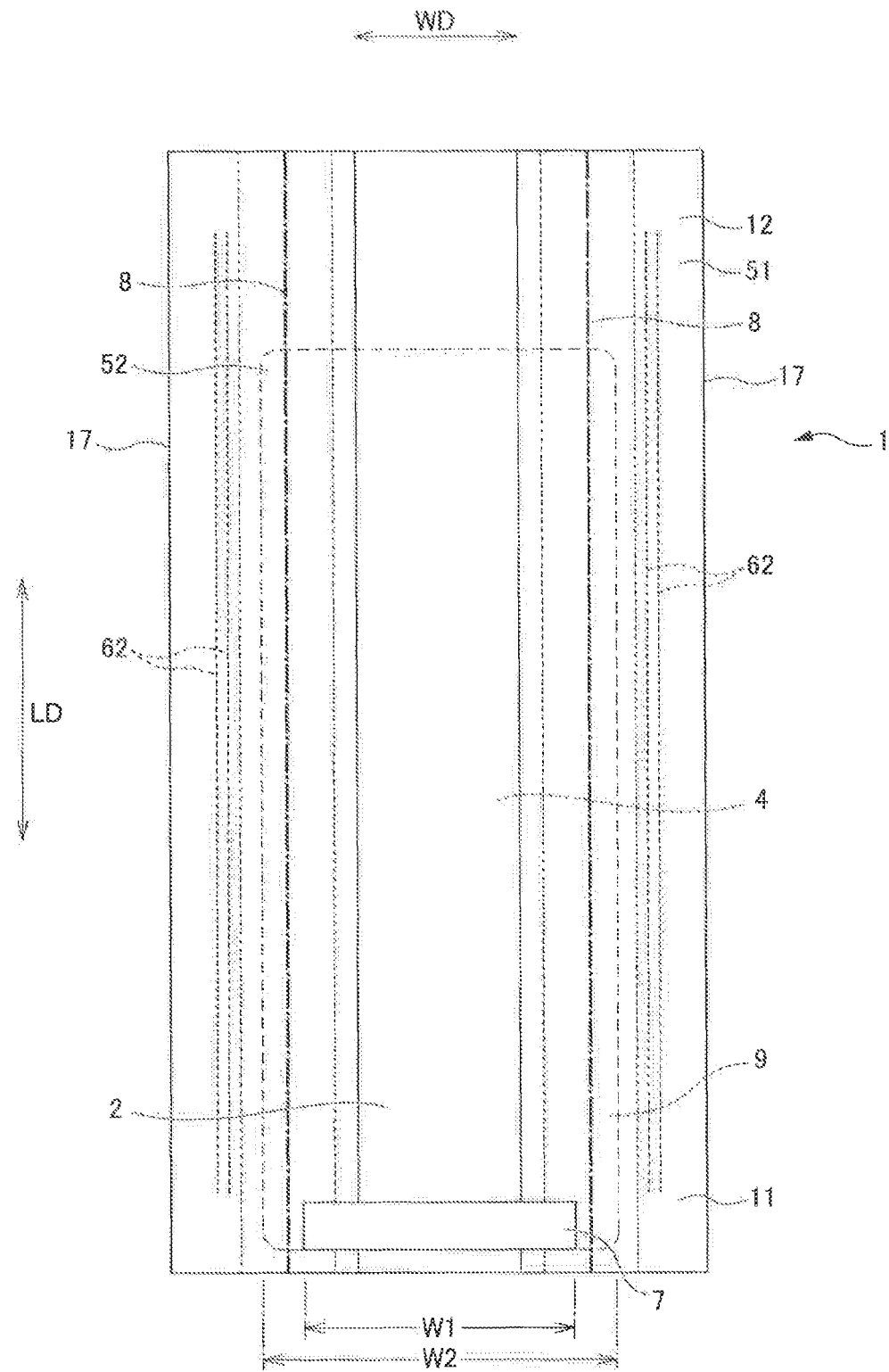
FIG. 15 is a plan view of the absorbent article for pet according to a third embodiment, as viewed from the top sheet side.

Next, the absorbent article for pet 1 according to the third embodiment will be described hereinafter with reference to FIG. 15. FIG. 15 is a plan view of the absorbent article for pet 1 according to a third embodiment, as viewed from the top sheet side.

The absorbent article for pet 1 according to the third embodiment is different from the second embodiment mainly in that the pair of folding lines 8 are formed also on the absorbent core 4, and the side sheets 51, 52 are configured differently.

In the third embodiment, the absorbent core 4 is disposed to extend to the vicinity of the first end portion 11, as shown in FIG. 15. In addition, the pair of folding lines 8 are formed by creasing not only the top sheet 2, the pair of side sheets 51, 52, the back surface sheet 31 and the waterproof sheet 32, but also the absorbent core 4.

In the third embodiment, a dimension of the hook tape 7 in the width direction WD of the absorbent article for pet 1 is configured to be smaller than the width of the absorbent core 4 in the width direction WD.

In the third embodiment, the pair of side sheets 51, 52 include a hydrophilic nonwoven fabric. In addition, the first elastic member 61 is not disposed on the inner edge of each of the pair of side sheets 51, 52. As described above, if the first elastic member 61 is not disposed on the inner edge of each of the pair of side sheets 51, 52, the free ends of the pair of side sheets 51, 52 do not lift, and the pocket portions 14, 15 are not formed between the inner surfaces of the pair of side sheets 51, 52 and the top sheet 2.

The absorbent article for pet 1 according to the third embodiment provides the above effects (1) to (4) and (6).

Figure 16:
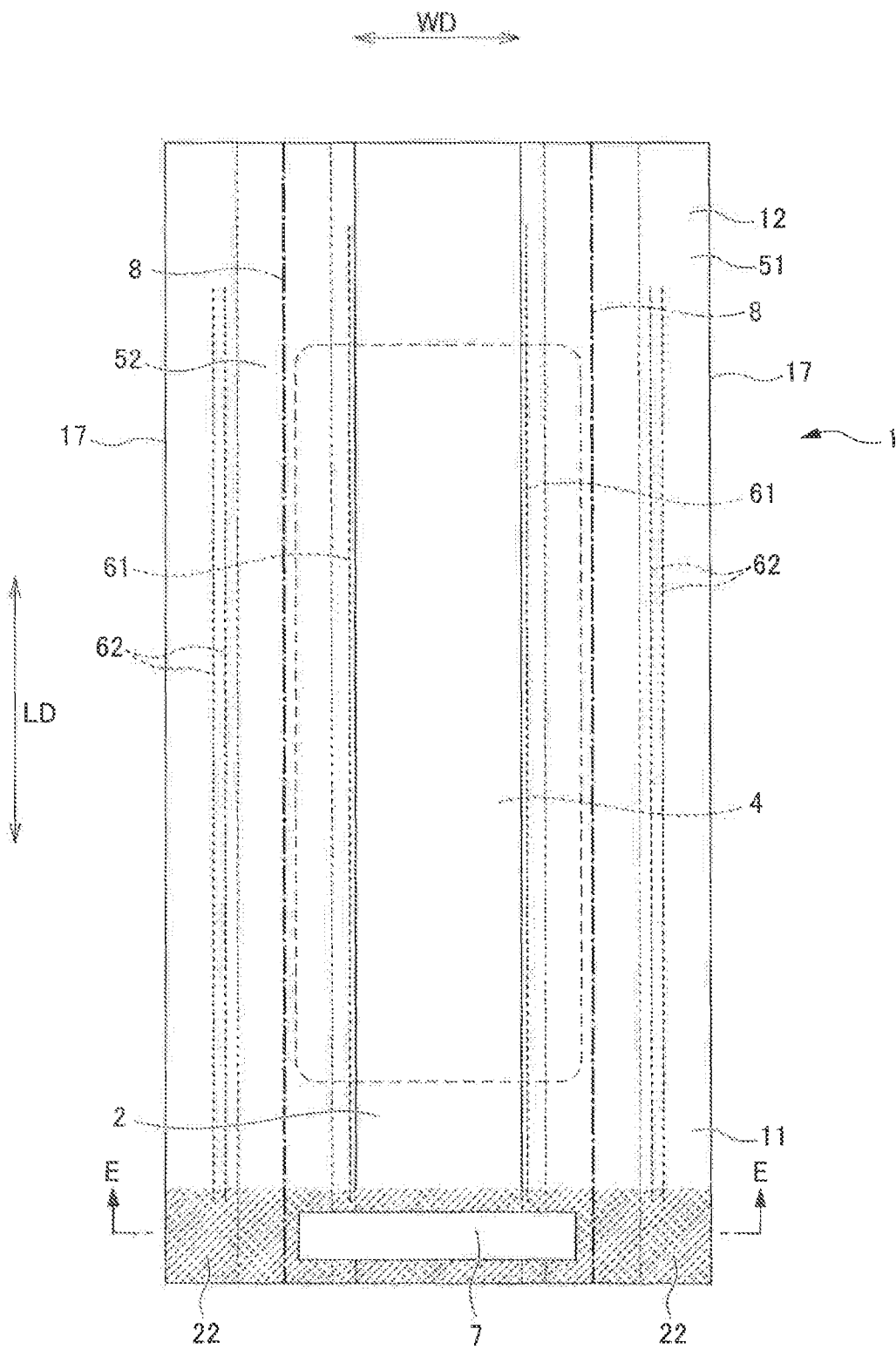
FIG. 16 is a plan view of the absorbent article for pet according to a fourth embodiment, as viewed from the top sheet side.
Figure 17:
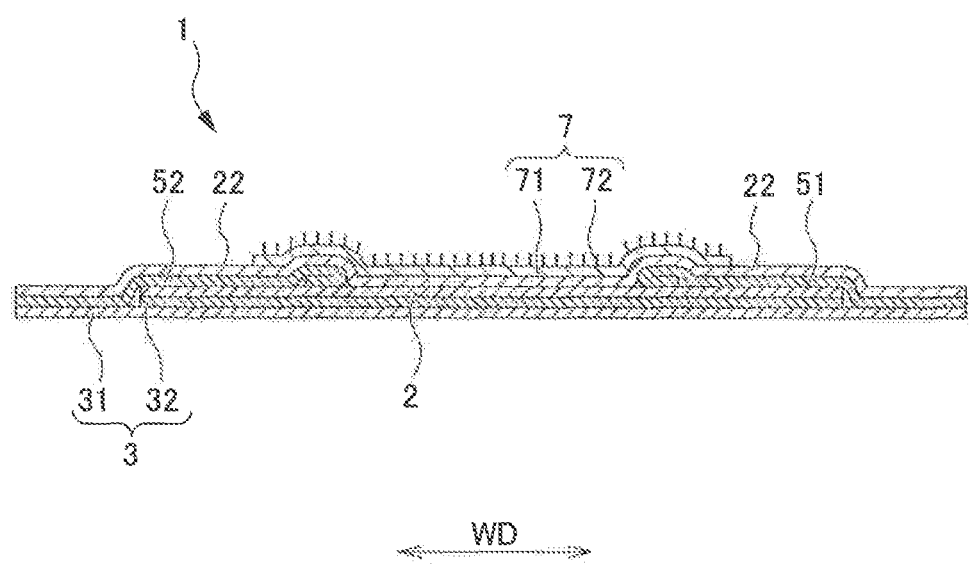
FIG. 17 is a sectional view taken along the line E-E of FIG. 14.

The absorbent article for pet 1 according to the fourth embodiment will be described hereinafter with reference to FIGS. 16 and 17. FIG. 16 is a plan view of the absorbent article for pet 1 according to the fourth embodiment, as viewed from the top sheet side; and FIG. 17 is a sectional view taken along the line E-E of FIG. 16.

The absorbent article for pet 1 according to the fourth embodiment is different from the second embodiment mainly in that the second engaged portion 22 is configured independently from the side sheets 51, 52.

The second engaged portion 22 is a piece of material configured independently from the side sheets 51, 52 and formed in a rectangular shape that extends in the width direction WD of the absorbent article for pet 1, on the pair of side sheets 51, 52 at the first end portion 11. In addition, the second engaged portion 22 is configured of a nonwoven fabric.

The absorbent article for pet 1 according to the fourth embodiment provides the following effects, in addition to the above effects (1) to (6).

(7) The second engaged portion 22 is configured independently from the side sheets 51, 52. As a result, a nonwoven fabric constituting the second engaged portion 22 can be selected independently from the engagement force of the side sheets 51, 52 with the hook tape 7.

Figure 18:
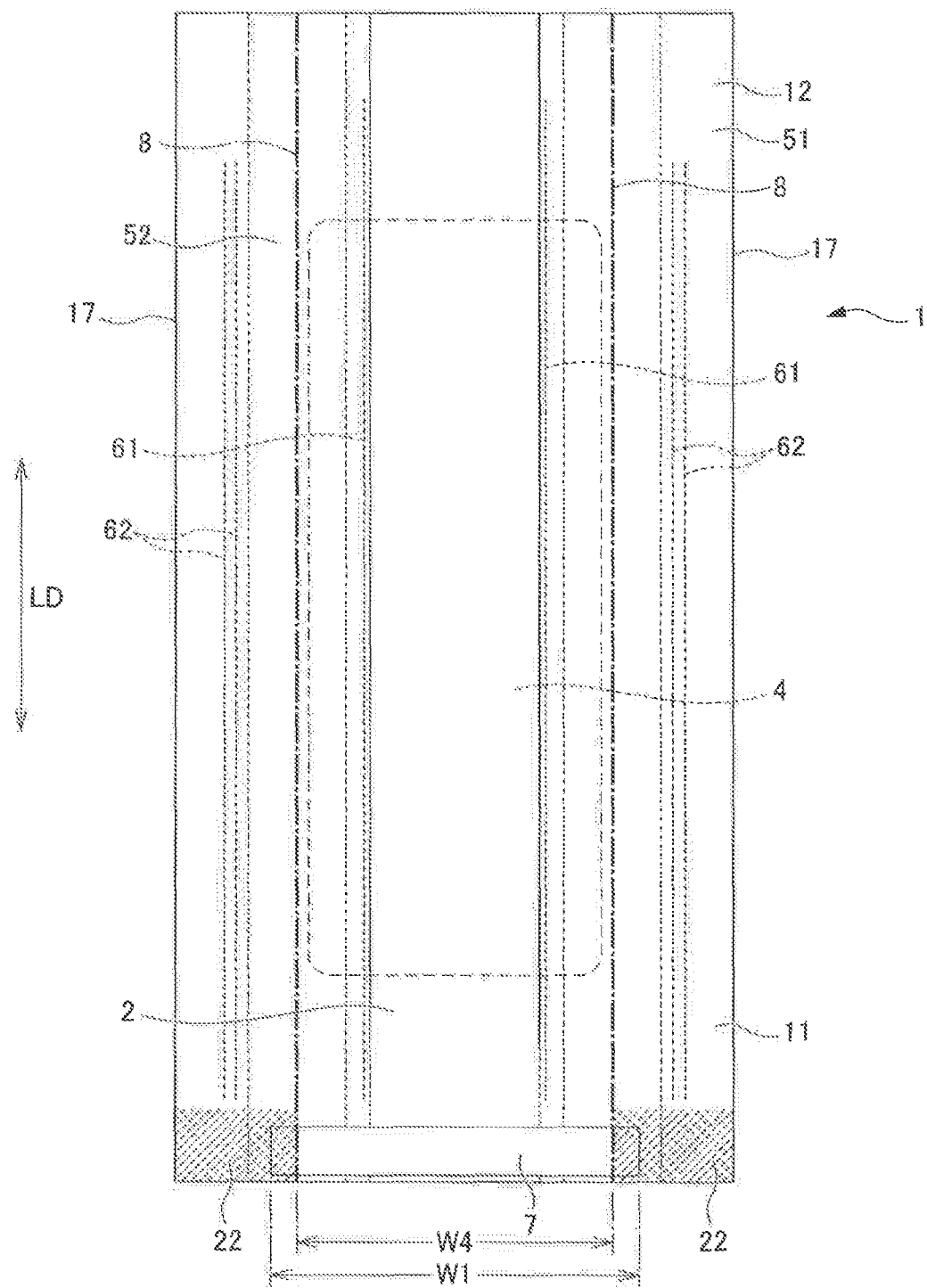
FIG. 18 is a plan view of the absorbent article for pet according to a fifth embodiment, as viewed from the top sheet side.

The absorbent article for pet 1 according to the fifth embodiment will be described hereinafter with reference to FIG. 18. FIG. 18 is a plan view of the absorbent article for pet 1 according to the fifth embodiment, as viewed from the top sheet side.

The absorbent article for pet 1 according to the fifth embodiment is different from the second embodiment mainly in that the dimension W1 of the hook tape 7 in the longitudinal direction thereof is configured to be greater than the dimension W4 between the pair of folding lines 8.

In the fifth embodiment, opposite ends of the hook tape 7 in the longitudinal direction thereof are positioned outward of the pair of folding lines 8 in the width direction WD of the absorbent article for pet 1 as shown in FIG. 18. In addition, the hook tape 7 is arranged as close as possible to an edge of the first edge portion 11.

The absorbent article for pet 1 according to the fifth embodiment provides the following effects, in addition to the above effects (1) to (4) and (6).

(8) The dimension W1 of the hook tape 7 in the longitudinal direction thereof is configured to be greater than the dimension W4 of a distance between the pair of folding lines 8. An engagement force between the first end portion 11 and the second end portion 12 upon putting on the absorbent article for pet 1 to the pet can thus be made greater.

(9) The hook tape 7 is arranged as close as possible to an edge of the first edge portion 11. An effective length of the absorbent article for pet 1 can thus be made greater.

The preferred embodiments of the present invention have been described; however, the present invention is not limited thereto and can be modified in various manners.

For example, in the above-described embodiments, the back surface layer 3 includes two layers: the back surface sheet 31 and the waterproof sheet 32; however, the present invention is not limited thereto. In other words, the back surface layer can include only the back surface sheet or the waterproof sheet.

In the above-described embodiments, the side sheets 51, 52 include a nonwoven fabric; however, the present invention is not limited thereto. In other words, the side sheets can include a film.

In addition, in the fourth embodiment, the second engaged portion 22 includes a nonwoven fabric; however, the present invention is not limited thereto. In other words, the second engaged portion can include a film.

In the above-described embodiments, the absorbent article for pet 1 in a state of being folded in two in the longitudinal direction has been described; however, the present invention is not limited thereto. In other words, the absorbent article for pet can also be folded in three or more.

In the above-described embodiments, various elements are described to have rectangular or substantially rectangular shapes; however, the present invention is not limited thereto. In other words, other shapes such as oval shape, hourglass-shape, and so on are contemplated in further embodiments.

This application claims the benefit of Japanese Application No. 2011-124671 the entire disclosure of which is incorporated by reference herein.

The invention claimed is:

1. An absorbent article configured to be worn in a state of being wrapped around a waist of a pet, the absorbent article comprising:
    a top sheet having a liquid permeable nonwoven fabric;
    a liquid impermeable back surface layer;
    an absorbent core disposed between the top sheet and the back surface layer;
    a first end portion and a second end portion opposing to each other in a longitudinal direction of the absorbent article;
    a pair of side portions opposing to each other in a width direction of the absorbent article;
    a hook member disposed along the width direction of the absorbent article on the top sheet in a vicinity of the first end portion and inward of an edge of the first end portion in the longitudinal direction of the absorbent article;
    a first engaged portion provided on the back surface layer in a vicinity of the second end portion and engageable with the hook member;
    a pair of folding lines extending in the longitudinal direction of the absorbent article; and
    a second engaged portion provided on the top sheet in the vicinity of the first end portion and located outward of the pair of folding lines in the width direction of the absorbent article,
    wherein the second engaged portion is engageable with the hook member, with an engagement force smaller than an engagement force of the top sheet with the hook member, in a state in which the pair of side portions are folded inward from the pair of folding lines and the second engaged portion covers at least a part of the hook member.

2. The absorbent article according to claim 1, further comprising a pair of side sheets disposed on the pair of side portions,
    wherein each of the side sheets has an outer edge joined with the top sheet and an inner edge including at least a part of a free end, and
    wherein the inner edges of the pair of side sheets are positioned inward of the pair of folding lines in the width direction of the absorbent article.

3. The absorbent article according to claim 2,
    wherein a distance from each of the pair of folding lines to the outer edge of the respective side sheet is longer than a distance from the each of the pair of folding lines to the inner edge of the respective side sheet.

4. The absorbent article according to claim 2,
    wherein the back surface layer and the side sheets include a nonwoven fabric engageable with the hook member; and
    an engagement force of the side sheets with the hook member is smaller than an engagement force of the back surface layer with the hook member.

5. The absorbent article according to claim 1, wherein
    a dimension of the hook member in a longitudinal direction thereof is 30 to 80% of a dimension of the absorbent article in the width direction thereof; and
    in the state in which the pair of side portions are folded inward from the pair of folding lines, the second engaged portion covers 50% to 100% of an entire area of the hook member.

6. The absorbent article according to claim 1, wherein
    a dimension of the hook member in a longitudinal direction thereof is 45 to 70% of a dimension of the absorbent article in the width direction thereof; and in the state in which the pair of side portions are folded inward from the pair of folding lines, the second engaged portion covers 50% to 100% of an entire area of the hook member.

7. The absorbent article according to claim 2, wherein the second engaged portion is formed of a part of the pair of side sheets.

8. The absorbent article according to claim 2, wherein the second engaged portion is formed of a piece of material independently from the side sheets.

9. The absorbent article according to claim 1, wherein the pair of folding lines are located outward of the hook member in the width direction of the absorbent article.

10. The absorbent article according to claim 1, wherein opposite ends of the hook member in a longitudinal direction thereof are positioned outward of the pair of folding lines in the width direction of the absorbent article.

11. The absorbent article according to claim 1, wherein the pair of folding lines are formed in the absorbent core.

12. The absorbent article according to claim 1, wherein the hook member continuously extends in the vicinity of the first end portion along the width direction of the absorbent article.

* * * * *